Feb. 16, 1932.  J. FIEUX  1,845,592
GYROSCOPE SUSPENSION
Filed April 11, 1930

INVENTOR
Jean Fieux.
BY Cameron, Kerkam & Sutton
ATTORNEYS.

Patented Feb. 16, 1932

1,845,592

UNITED STATES PATENT OFFICE

JEAN FIEUX, OF PARIS, FRANCE, ASSIGNOR OF ONE-HALF TO SCHNEIDER & CIE., OF PARIS, FRANCE, A LIMITED JOINT-STOCK COMPANY OF FRANCE

GYROSCOPE SUSPENSION

Application filed April 11, 1930, Serial No. 443,575, and in France May 30, 1929.

The object of the invention is to provide a means for suspending gyroscopes having a number of degrees of freedom of movement, such as those empoyed on board ships for establishing directions or planes of reference (gyro-compass, azimuth reference lines, artificial horizons, etc.) which means permits the disturbing effects resulting from the friction in the suspension pivots to be reduced to a practically negligible value.

A ball bearng suspension which is robust and permits the pivot members to make relative movements of unlimited amplitude is generally preferred in gyroscopes to the knife suspension currently employed in the construction of scales or balances. Nevertheless the use of ball or roller bearings for the suspension of members which can be likened to scale beams may lead to disappointments.

A ball or roller bearing mounted on a shaft rotating slowly and only carrying a small load does not offer as uniform a resistance to rotation as the same bearing with the same loading when mounted on a shaft rotating at high speed, a fact which can be verified by turning by hand the rings of a ball or roller bearing which is under ordinary conditions of lubrication and cleanliness. It may be admitted that the unavoidable presence of minute foreign bodies (dust or deposits of oil) on the rolling surfaces is the cause of momentary resistances which are very high with respect to the mean resistance to rotation.

These abnormal resistances may produce very considerable driving or braking forces on the suspended body. In particular they may interfere considerably, particularly in calm weather, with the good maintenance of ships' gyroscopes.

The present invention permits this disadvantage to be removed.

It consists essentially in the use of means imparting systematically a certain speed of rotation to the members carrying the ball or roller suspension bearings of these gyroscopes.

In other words, according to the invention, the spindles carrying the bearings are given a rotation of their own. The rotations are given a sufficient speed to obtain a uniform resistance to rolling, and a suitably chosen direction to neutralize practically the driving effects on the suspended element.

For this purpose use may be made of auxiliary motors; but according to a practical embodiment of the invention the horizontal journals of the casing of the rotor are driven by the motor of the rotor itself.

This practical embodiment of the invention is illustrated by way of example in the accompanying drawings, in which.

Figure 1:
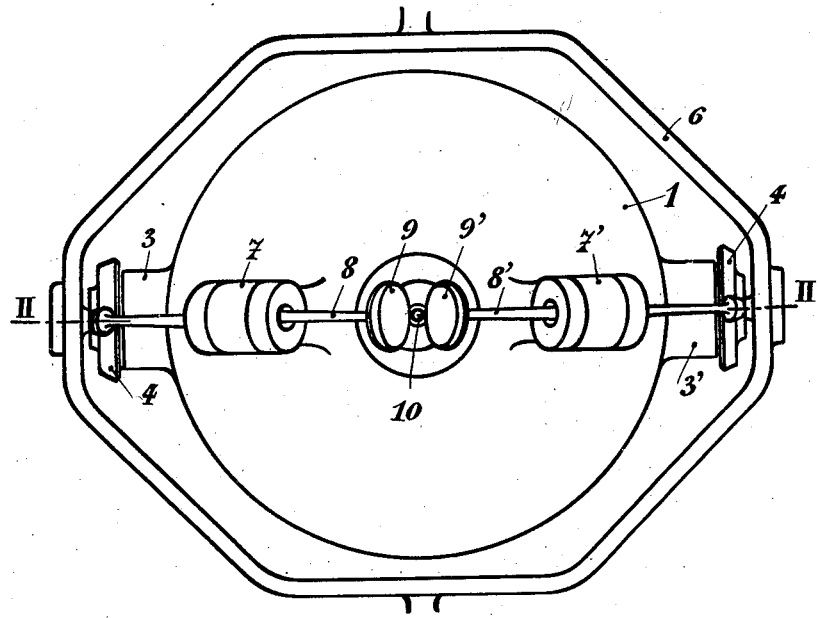
Figure 1 is an external view of a gyroscope suspended in accordance with the invention.
Figure 2:
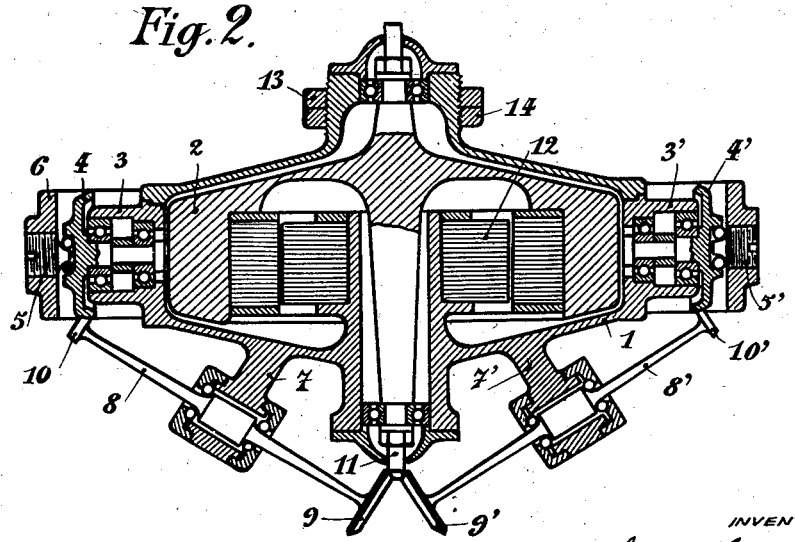
Figure 2 is a section taken along the line II—II in Figure 1.

The casing 1 of the rotor 2 is provided with false hollow trunnions 3, 3' in which two cup carrying shafts 4, 4' can turn round the suspension axis which coincides with the common axis of the ball trunnions 5, 5' rigid with the frame 6. The casing also carries two bearings 7, 7' in which the intermediate shafts 8, 8' are journalled, these shafts being rigid with the friction wheels 9, 9' and 10, 10' which receive their movement of rotation from the end 11 of the rotor shaft and actuate the cup carrying shafts 4, 4'.

The casing 1 also carries in the known manner the stator 12 of the motor which maintains the rotation of the gyroscope mass and at the same time, according to the invention secures the rotation of the cup carrying shafts 4, 4' at a suitably reduced speed.

It is to be noted that for reasons of symmetry the latter make contrary movements round the suspension axis. It will also be noted that the forces brought into action for driving the cup carrying shafts 4, 4' are internal to the suspended system and that they can exert no disturbing action on the balance of this system.

The usual balancing nuts 13 and 14 carried by the casing permit the disturbing effect, which is generally very small and practically constant, to be compensated, which disturbing effect may eventually arise from a difference in resistance to the rolling of the balls comprised between the cup on the shaft 4 and the journal 5 on the one hand, and between the cup on the shaft 4' and the journal 5' on the other hand.

It is easy to see that the constant movement of rotation communicated to the outer races of the balls interposed between the cup carrying members 4, 4' of the casing 1 and the trunnions 5, 5' of the frame 6, has the effect of preventing any accidental resistance which may arise for example through the presence of dust or other foreign bodies or from a tendency to jam resulting from lack of speed or from other various causes. To sum up, the invention provides a perfect safeguard for the preservation of the freedom of movement of the gyroscope, which is suspended like a true floating member in spite of the precision of the position of its axis which is inherent to mechanical connections.

Claims:

1. In a gyroscope, suspension means for permitting freedom of movement about a horizontal axis comprising a pair of bearings, and means driven by the rotor of the gyroscope for continuously rotating said bearings.

2. In a gyroscope, suspension means for permitting freedom of movement about a horizontal axis comprising a pair of bearings, and means driven by the rotor of the gyroscope for continuously rotating said bearings in opposite directions with respect to one another.

3. In a gyroscope having a casing and a rotor journalled in said casing, suspension means for permitting freedom of movement of said casing about a horizontal axis comprising a frame having a pair of diametrically opposite bearing surfaces, trunnions on said casing coaxial with said bearing surfaces, shafts interposed between said trunnions and said frame bearing surfaces, rolling means interposed between said shafts and said bearing surfaces, additional rolling means interposed between said shafts and said trunnions, and means for rotating said shafts comprising a pair of intermediate shafts journalled in the casing and driven from the rotor shaft of said gyroscope.

4. In a gyroscope having a casing and a rotor journalled in said casing, suspension means for permitting freedom of movement of said casing about a horizontal axis comprising a frame having a pair of diametrically opposite bearing surfaces, trunnions on said casing coaxial with said bearing surfaces shafts interposed between said trunnions and said frame bearing surfaces, rolling means interposed between said shafts and said bearing surfaces, additional rolling means interposed between said shafts and said trunnions, and means for continuously rotating said shafts in opposite directions with respect to one another comprising a pair of intermediate shafts journalled in the casing and driven from the rotor shaft of said gyroscope.

5. In a gyroscope having a casing and a rotor journalled in said casing, suspension means for permitting freedom of movement of said casing about a horizontal axis, said suspension means comprising a frame, trunnions on said casing, bearing members carried by said trunnions, rolling members carried by said frame, and means interposed between said bearing members and rolling members for rotating said members.

6. In a gyroscope having a casing and a rotor journalled in said casing, suspension means for permitting freedom of movement of said casing about a horizontal axis, said suspension means comprising a frame, trunnions on said casing, bearing members carried by said trunnions, rolling members carried by said frame, and means interposed between said bearing members and rolling members driven by the rotor shaft of said gyroscope for rotating said members.

7. In a gyroscope having a casing and a rotor journalled in said casing, suspension means for permitting freedom of movement of said casing about a horizontal axis, said suspension means comprising a frame, a pair of trunnions on said casing, bearing members carried by said trunnions, rolling members carried by said frame, supporting members for said bearing and rolling members, and means for continuously rotating said supporting members in opposite directions with respect to one another.

8. In a gyroscope having a casing and a rotor journalled in said casing, suspension means for permitting freedom of movement of said casing about a horizontal axis, said suspension means comprising a frame, a pair of trunnions on said casing, bearing members carried by said trunnions, rolling members carried by said frame, supporting members for said bearing and rolling members, and means driven by the rotor shaft of said gyroscope for continuously rotating said supporting members in opposite directions with respect to one another.

In testimony whereof I have signed this specification.

JEAN FIEUX.